(12) United States Patent
Nakao et al.

(10) Patent No.: US 9,363,460 B2
(45) Date of Patent: Jun. 7, 2016

(54) PHOTORECEIVER AND DISPLAY DEVICE

(71) Applicant: Panasonic Corporation, Osaka (JP)

(72) Inventors: Suguru Nakao, Hyogo (JP); Naoto Tada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 51 days.

(21) Appl. No.: 14/306,742

(22) Filed: Jun. 17, 2014

(65) Prior Publication Data
US 2015/0212355 A1 Jul. 30, 2015

(30) Foreign Application Priority Data

Jan. 29, 2014 (JP) .................................. 2014-014043
May 15, 2014 (JP) .................................. 2014-101035

(51) Int. Cl.
| | |
|---|---|
| H04N 5/64 | (2006.01) |
| H04N 5/44 | (2011.01) |
| G02B 6/42 | (2006.01) |
| H04B 10/11 | (2013.01) |
| H04B 10/114 | (2013.01) |
| H04N 21/422 | (2011.01) |
| G08C 23/04 | (2006.01) |

(52) U.S. Cl.
CPC ................ H04N 5/64 (2013.01); G02B 6/4206 (2013.01); H04B 10/1141 (2013.01); H04N 5/4403 (2013.01); *G08C 23/04* (2013.01); *H04N 21/42206* (2013.01); *H04N 2005/4426* (2013.01)

(58) Field of Classification Search
None
See application file for complete search history.

(56) References Cited

U.S. PATENT DOCUMENTS

2003/0175038 A1* 9/2003 Maeda ................. G02B 6/4202
398/202
2008/0165310 A1* 7/2008 Senoue .............. H04B 10/1141
349/116

FOREIGN PATENT DOCUMENTS

JP 2008-078896 A 4/2008

* cited by examiner

Primary Examiner — Jerry Rahll
(74) Attorney, Agent, or Firm — Renner, Otto, Boisselle & Sklar, LLP

(57) ABSTRACT

As a photoreceiver for a remote controller used in a display device or the like, a photoreceiver that is compact and has excellent light receiving sensitivity is provided. The photoreceiver includes a light receiving sensor that receives remote controller signal light from a remote controller to convert the received remote controller signal light into an electric signal, and a light guide body that guides the remote controller signal light to the light receiving sensor. The light guide body includes at least a first light guide body including an incident surface upon which the remote controller signal light is incident, and a second light guide body including an emission surface from which remote controller signal light is emitted, and a section of the first light guide body shows a round cornered rectangle, and a section of the second light guide body shows a substantial rectangle.

4 Claims, 9 Drawing Sheets

PHOTORECEIVER AND DISPLAY DEVICE

BACKGROUND OF THE INVENTION

1. Field of the Invention

The present disclosure relates to a photoreceiver and a display device that receive remote controller signal light from a wireless remote controller (hereinafter, referred to as a remote controller) that remotely controls an electronic device such as a display device.

2. Description of the Related Art

Televisions that use liquid crystal display devices or the like or thin display devices such as monitors for various advertisements are being used in various installation modes with widespread use in ordinary homes and many commercial facilities. The installation modes include, for example, a mode where a device is installed on a wall of a house, a mode where a device is placed on furniture, a mode where a device is incorporated, a mode where a device is suspended from a ceiling, and the like.

Recently, the increasing number of thin display devices have large screens and have compact narrow frame appearance designs.

Furthermore, in the thin display devices, device operation including switching from ON/OFF of a power supply to channels, switching of input signals, and the like are generally performed by use of a remote controller (e.g., see Unexamined Japanese Patent Publication No. 2008-78896).

Accordingly, in the thin display devices, a device that is compact and has excellent light receiving sensitivity is demanded as a photoreceiver that receives remote controller signal light from a remote controller.

SUMMARY OF THE INVENTION

The present disclosure provides a photoreceiver and a display device that are compact and have excellent light receiving sensitivity as a photoreceiver and a display device that receive remote controller signal light from a remote controller.

A photoreceiver according to the present disclosure includes a light receiving sensor that receives remote controller signal light from a remote controller to convert the received remote controller signal light into an electric signal, and a light guide body that guides the remote controller signal light to the light receiving sensor. The light guide body includes at least a first light guide body that includes an incident surface upon which the remote controller signal light is incident, and a second light guide body that includes an emission surface from which remote controller signal light is emitted, a section of the first light guide body shows a round cornered rectangle, and a section of the second light guide body shows a substantial rectangle.

In the photoreceiver according to the present disclosure, a ratio of incidence of the remote controller signal light emitted from the remote controller to be incident inside the light guide body and into the light receiving sensor becomes greater, while a part of the section of the light guide body shows the round cornered rectangle so as to be fitted to a round cornered rectangular light receiving window, thereby enabling prevention of the lowering of the light receiving sensitivity of the remote controller.

DETAILED DESCRIPTION OF THE PREFERRED EMBODIMENT

Hereinafter, an exemplary embodiment is described in detail with reference to the drawings. However, excessively detailed description may be omitted. For example, detailed description of matters that are already well known, or redundant description for substantially the same configuration may be omitted. This is to avoid making the following description unnecessarily redundant, and to facilitate the understanding by a person skilled in the art.

The attached drawings and the following description are provided in order that a person skilled in the art sufficiently understands the present disclosure, and does not intend to limit the subject matter recited in the scope of the claims by these.

Exemplary Embodiment

Hereinafter, an exemplary embodiment is described with reference to the drawings. In the exemplary embodiment, a thin liquid crystal television is described as an example of a display device.

[1-1. Configuration]

Figure 1A:
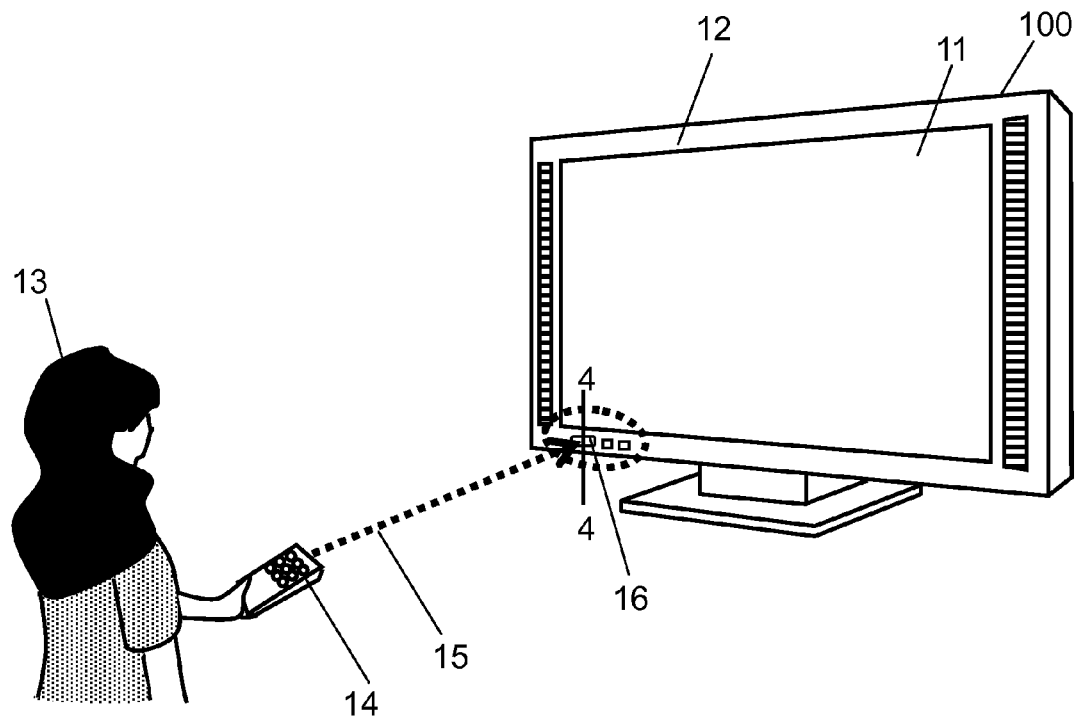
FIG. 1A is a perspective view showing a thin liquid crystal television including a photoreceiver according to an exemplary embodiment.
Figure 1B:
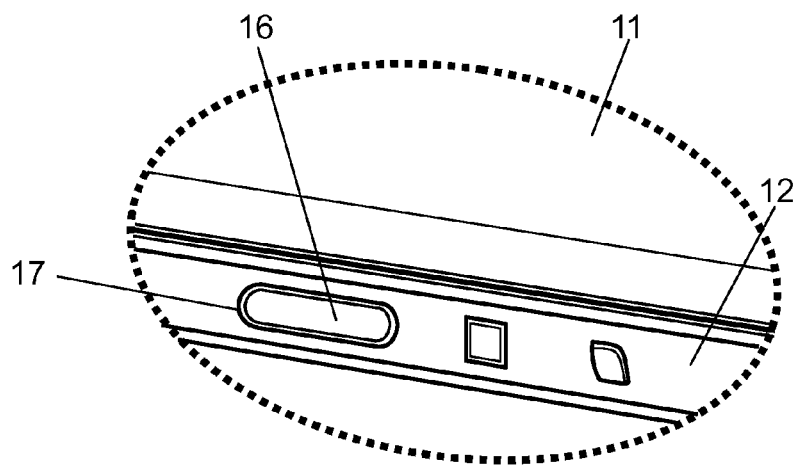
FIG. 1B is an enlarged view in which a dotted line part of FIG. 1A is enlarged.

FIG. 1A is a perspective view showing a thin liquid crystal television including a photoreceiver according to the exemplary embodiment, and FIG. 1B is an enlarged view showing an enlarged part that is surrounded by a dotted line of FIG. 1A.

In FIG. 1A and FIG. 1B, flat plate-like thin liquid crystal television 100 has bezel 12 of a narrow frame that is provided around liquid crystal display panel 11. At a lower side of bezel 12, photoreceiver 16 that receives remote controller signal light 15 such as an infrared signal from remote controller 14 operated by user 13 is installed in light receiving window 17 that is an opening of the bezel. Bezel 12 is formed by extrusion molding, press molding, or resin molding of metal such as aluminum. Light receiving window 17 is formed in a round cornered rectangle in consideration of the workability of bezel 12.

Figure 2A:
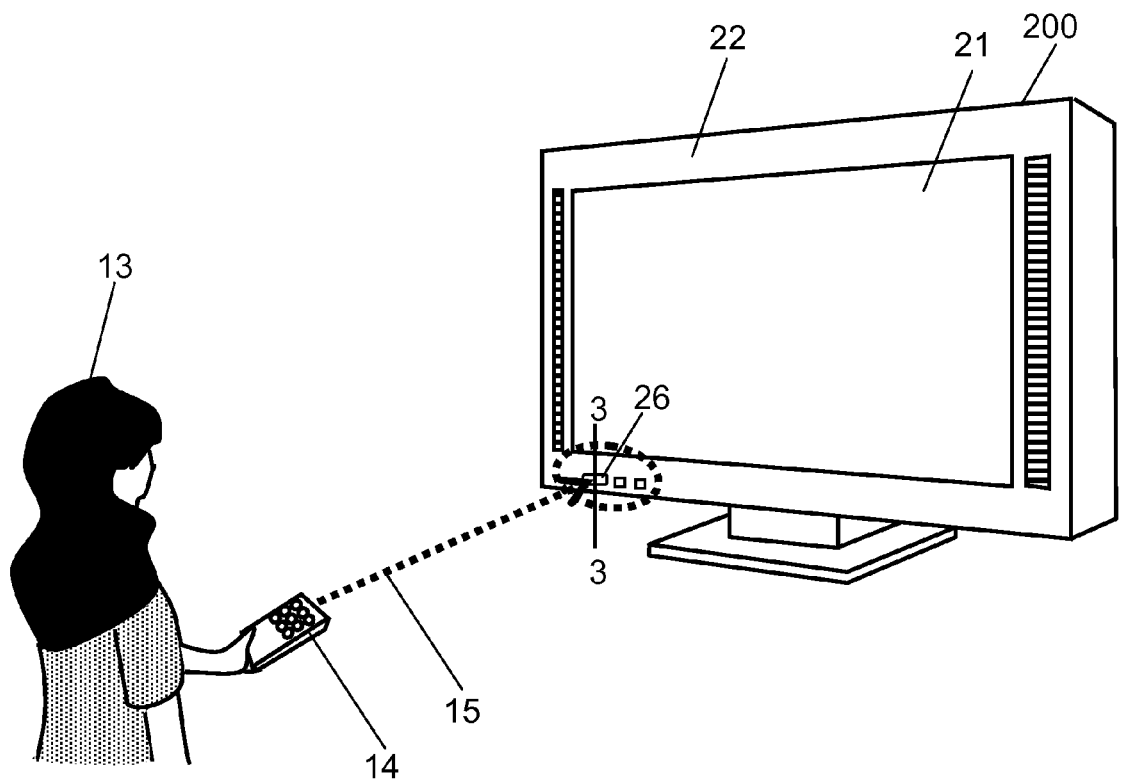
FIG. 2A is a perspective view showing a liquid crystal television including a conventional photoreceiver.
Figure 2B:
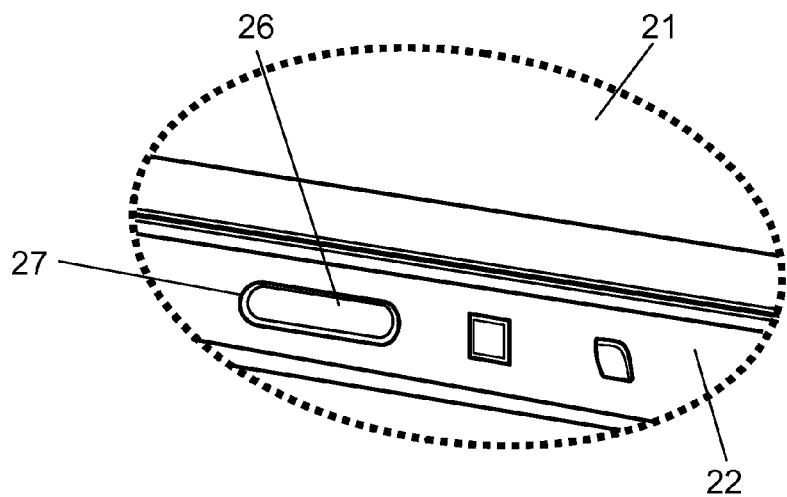
FIG. 2B is an enlarged view in which a dotted line part of FIG. 2A is enlarged.
Figure 3:
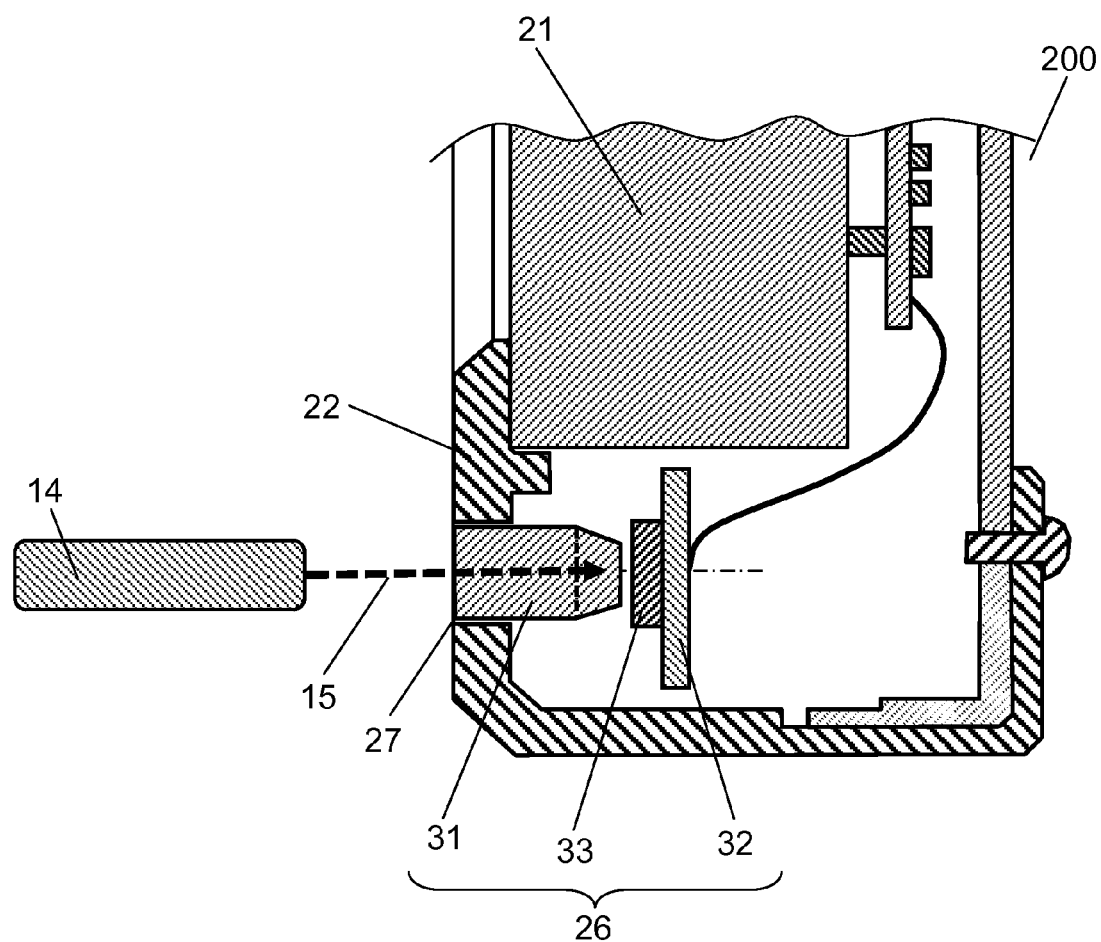
FIG. 3 is a sectional view taken along line 3-3 of FIG. 2A.

A problem of the photoreceiver in the thin liquid crystal television is now described. FIG. 2A is a perspective view showing a conventional liquid crystal television, and FIG. 2B is an enlarged view showing an enlarged part that is surrounded by a dotted line of FIG. 2A. In FIG. 2A and FIG. 2B, liquid crystal television 200 has bezel 22 that is provided around liquid crystal display panel 21. At a lower side of bezel 22, photoreceiver 26 that receives remote controller signal light 15 such as an infrared signal from remote controller 14 operated by user 13 is installed in light receiving window 27 that is an opening of bezel 22. FIG. 3 is a sectional view taken along line 3-3 of liquid crystal television 200 of FIG. 2A.

As shown in FIG. 3, in conventional liquid crystal television 200 having bezel 22 that is not a narrow frame, light receiving window 27 that is an opening is provided in bezel 22 below liquid crystal display panel 21. Photoreceiver 26 is configured so that remote controller signal light 15 that is irradiated from remote controller 14 is guided through light guide body 31 to light receiving sensor 33 that is mounted on printed wiring board 32, guide body 31 transmitting remote controller signal light 15 and being formed of columnar transparent resin.

All the configurations of photoreceiver 26 are disposed on a rear surface of bezel 22 below liquid crystal display panel 21, and therefore an optical path length of light guide body 31 can be reduced. Accordingly, even when remote controller 14 irradiates remote controller signal light 15 from a right or left position with respect to light receiving window 27, liquid crystal television 200 can be operated without the lowering of light receiving sensitivity.

However, with increase in design of the narrow frame of the liquid crystal television, it becomes difficult to dispose the entire photoreceiver on the rear surface of the bezel below the liquid crystal display panel. Therefore, the light receiving sensor has to be disposed on a rear side with respect to the liquid crystal display panel, and an entire length of the light guide body has to be increased.

Figure 4:
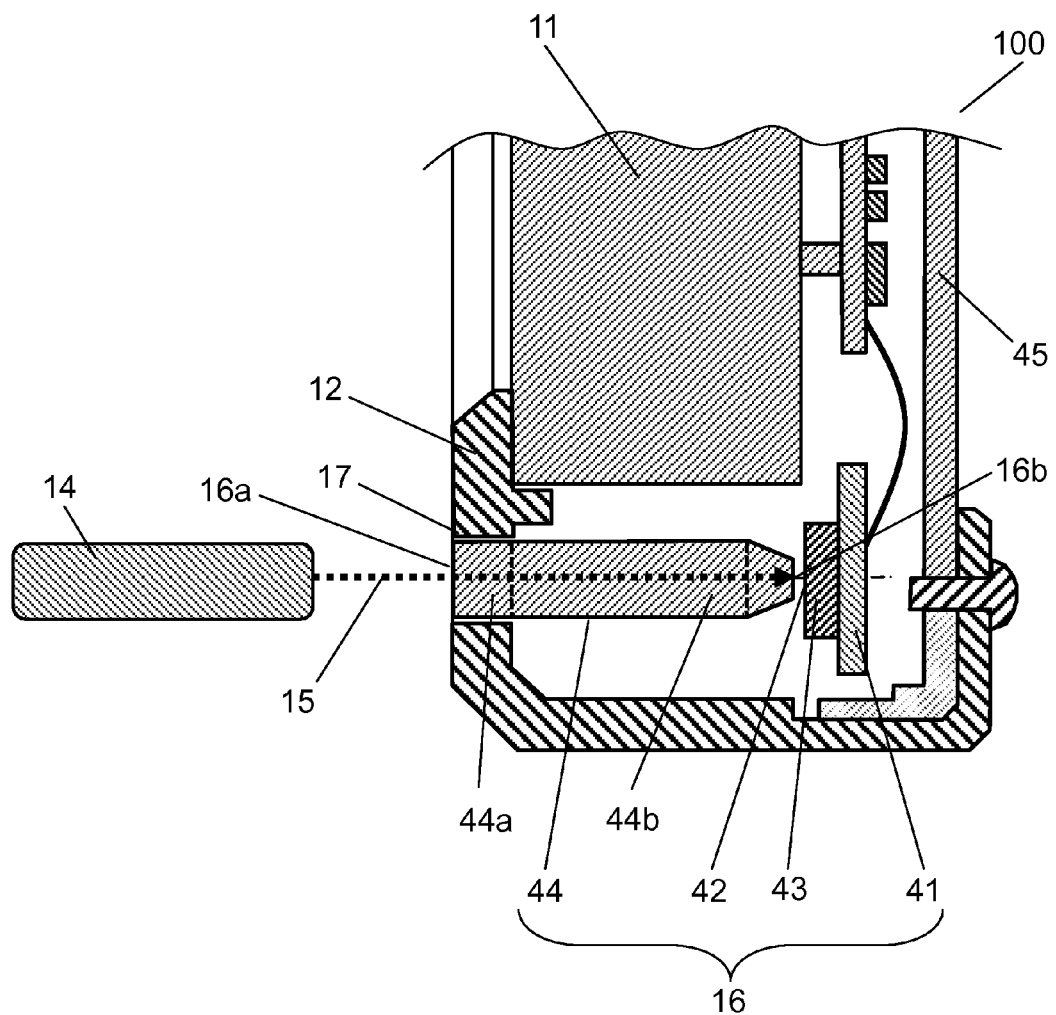
FIG. 4 is a sectional view taken along line 4-4 of FIG. 1A.

In this exemplary embodiment, as a shape of the light guide body, a hybrid configuration that has two different sectional shapes is employed. FIG. 4 is a sectional view taken along line 4-4 in thin liquid crystal television 100 of FIG. 1A, and FIG. 5 is a perspective view of photoreceiver 16 of thin liquid crystal television 100 of FIG. 1A, which includes a half sectional view of a peripheral outer part of photoreceiver 16.

Figure 5:
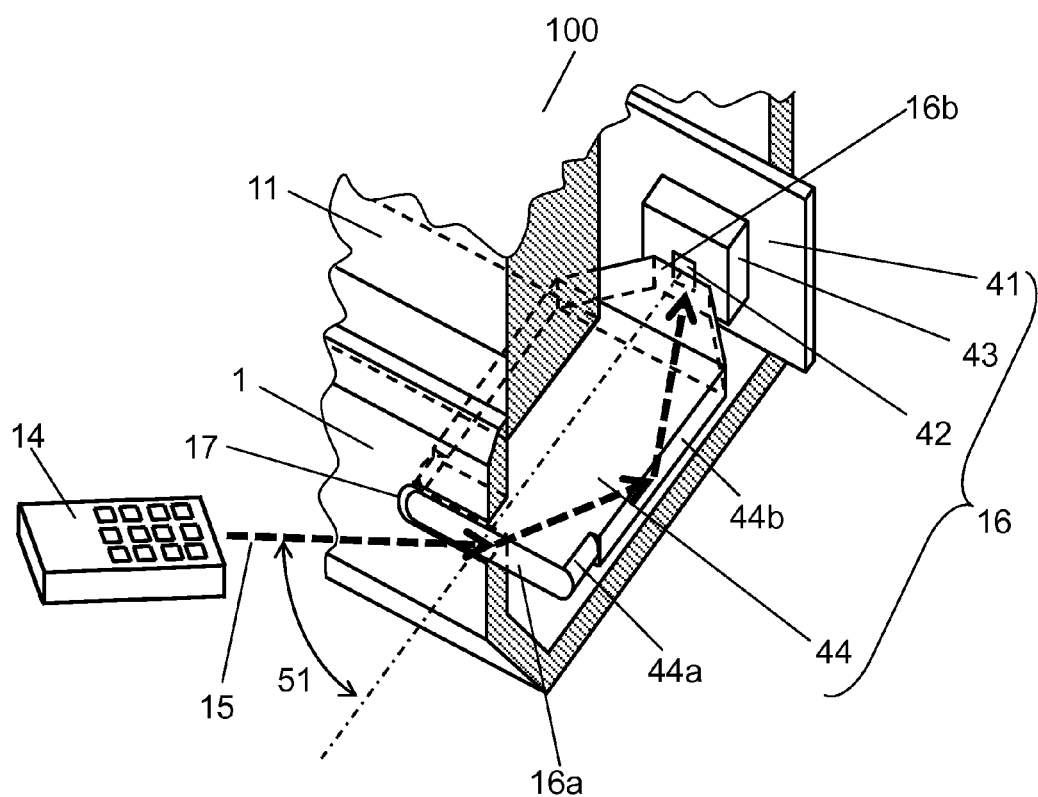
FIG. 5 is a perspective view of the photoreceiver of the thin liquid crystal television of FIG. 1A.

As shown in FIG. 4 and FIG. 5, photoreceiver 16 is configured by light receiving sensor 43 that is mounted on printed wiring board 41 and has light receiving window 42 which receives remote controller signal light 15, and columnar light guide body 44 that is a light guide member made of acrylic resin which allows light receiving window 42 to transmit remote controller signal light 15.

In order to enable the narrow frame of thin liquid crystal television 100, printed wiring board 41 is installed between liquid crystal display panel 11 and rear cover 45 on the rear side of liquid crystal display panel 11.

Light guide body 44 is configured by at least first light guide body 44a that includes incident surface 16a upon which remote controller signal light 15 is incident, and second light guide body 44b that includes emission surface 16b from which remote controller signal light 15 is emitted to light receiving window 42. First light guide body 44a has a round cornered rectangular section so as to be fitted to round cornered rectangular light receiving window 17. Second light guide body 44b has a substantially rectangular section. Light guide body 44 has a hybrid configuration that has at least two sectional shapes.

Remote controller angle 51 is an angle formed by remote controller 14 and photoreceiver 16, namely, an incident angle of remote controller signal light 15 of remote controller 14 with respect to incident surface 16a of light guide body 44. Remote control operation at a distance of several meters is possible in a range of about ±45 degrees in right and left directions with respect to incident surface 16a.

[1-2. Operation]

Operation of photoreceiver 16 configured as described above is described.

Figure 6A:
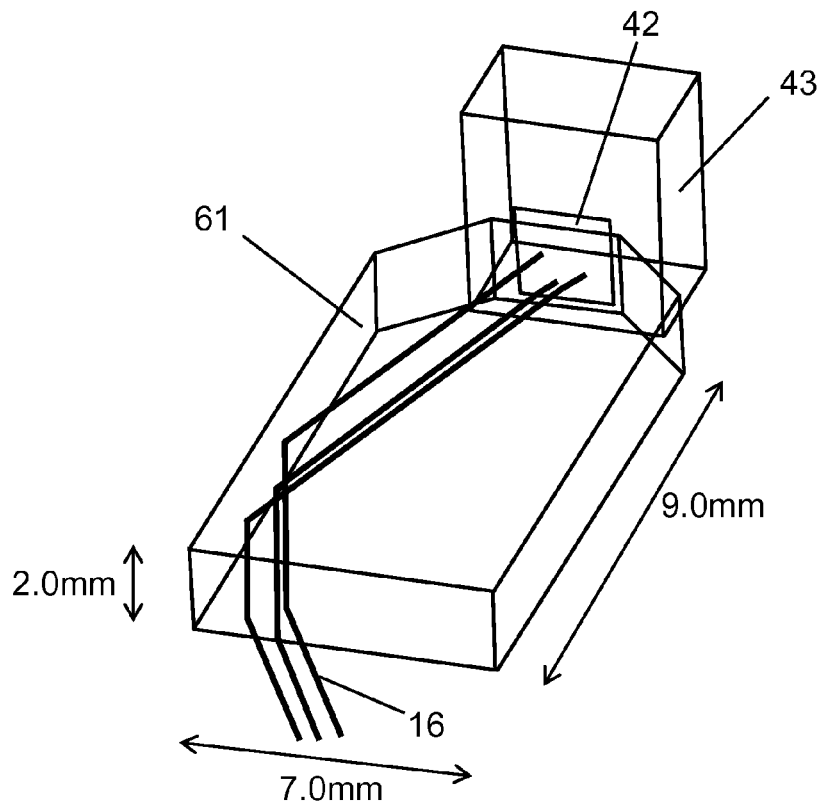
FIG. 6A is a schematic diagram showing a state where remote controller signal light inside a light guide body is reflected and refracted, in a case where the light guide body has a rectangular section.
Figure 6B:
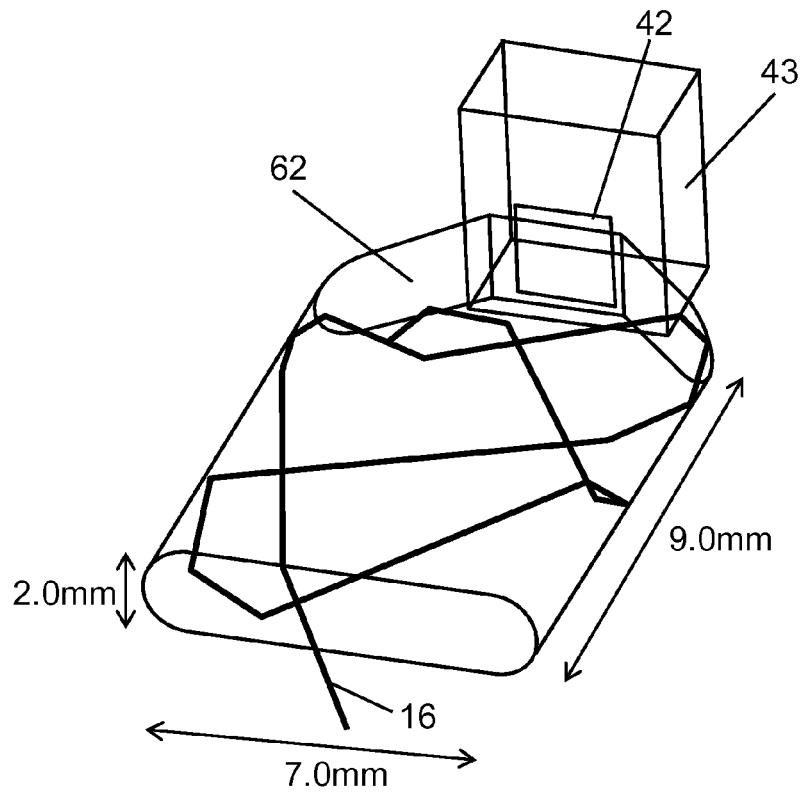
FIG. 6B is a schematic diagram showing a state where remote controller signal light inside a light guide body is reflected and refracted, in a case where the light guide body has a round cornered rectangular section.

FIG. 6A is a schematic diagram showing a state where remote controller signal light inside a light guide body is reflected and refracted in a case where the light guide body has a rectangular section. FIG. 6B is a schematic diagram showing a state where remote controller signal light inside a light guide body is reflected and refracted, in a case where the light guide body has a round cornered rectangular section.

FIG. 6A and FIG. 6B show respective ray-traced results of phenomena that remote controller signal light 15 emitted from remote controller 14 at a remote controller angle of about +30 degrees is incident inside light guide bodies 61 and 62 to be reflected and refracted, in a case where light guide body 61 has a rectangular section in FIG. 6A, and in a case where light guide body 62 has a round cornered rectangular section in FIG. 6B. A size of light guide body 61 is a height of 2.0 mm, a width of 7.0 mm, and a depth of 9.0 mm. A size of light guide body 62 is a height of 2.0 mm, a width of 7.0 mm, and a depth of 9.0 mm, and a ratio of a straight line to the height of the section is 0%.

When the traced result of FIG. 6A is compared with the traced result of FIG. 6B, a reaching ratio of remote controller signal light 15 to light receiving window 42 in the result of FIG. 6A is greater than that in the result of FIG. 6B.

Figure 7:
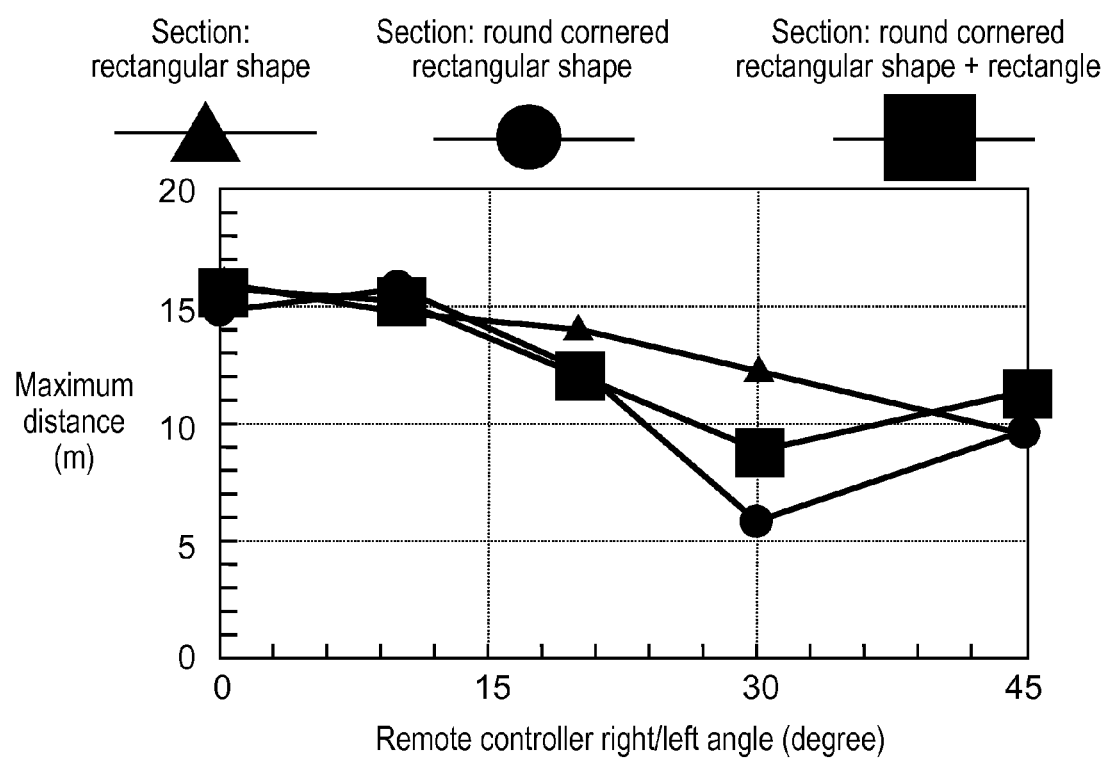
FIG. 7 is a characteristic diagram showing sensitivity of the remote controller, in a case where an incident angle of remote controller signal light of the remote controller is changed right and left with respect to a photoreceiver in which a section of a light guide body shows only a rectangle, a photoreceiver in which a section of a light guide body ishows only a round cornered rectangle, and a photoreceiver in which a section of a light guide body is formed of combination of a rectangle and a round cornered rectangle.

FIG. 7 is a characteristic diagram showing sensitivity of the remote controller, namely, maximum operable distances between remote controller 14 and the thin liquid crystal television, in a case where an incident angle of remote controller signal light 15 of remote controller 14 is changed right and left with respect to three types of photoreceivers, a photoreceiver in which a section of a light guide body shows only a rectangle, a photoreceiver in which a section of a light guide body shows only a round cornered rectangle, and a photoreceiver 16 of the present disclosure in which a section of a light guide body is formed of combination of a rectangle and a round cornered rectangle. A size of each light guide body is a height of 2.0 mm, a width of 7.0 mm, and a depth of 9.0 mm. In the light guide body of the photoreceiver whose section is formed of the combination of the rectangle and the round cornered rectangle, the rectangular sectional part and the round cornered rectangular sectional part have a depth of 8.0 mm and a depth of 1.0 mm out of a depth of 9.0 mm, respectively. A ratio of a straight line to the height of the section of the light guide body having the round cornered rectangular section is 0%.

In FIG. 7, a horizontal axis represents a remote controller right/left angle, namely, an incident angle of remote controller signal light 15 of remote controller 14, and a vertical axis represents a maximum operable distance between remote controller 14 and the thin liquid crystal television. In FIG. 7, when the remote controller right/left angle is ±30 degrees, the respective maximum distances of the three photoreceivers are greatly different. Specifically, the maximum distances of the photoreceiver in which the section of the light guide body shows only the rectangle, the photoreceiver in which the section of the light guide body is formed of the combination of the rectangle and the round cornered rectangle, and the photoreceiver in which the section of the light guide body shows only the round cornered rectangle become shorter in this order. Accordingly, photoreceiver 16 of this exemplary embodiment can suppress the lowering of light receiving sensitivity in a range of a remote controller right/left angle from 0 degree to ±45 degrees, compared to the photoreceiver in which the section of the light guide body shows only the round cornered rectangle.

Accordingly, also in a case where the printed wiring board is disposed on the rear side of the display panel due to increase in the narrow frame design of the thin display device such as the thin liquid crystal television, and an entire length of the light guide body is increased, light guide body 44 is configured by at least first light guide body 44a that includes incident surface 16a upon which remote controller signal light 15 is incident, and second light guide body 44b that includes emission surface 16b from which remote controller signal light 15 is emitted to light receiving window 42. Furthermore, first light guide body 44a has the round cornered rectangular section so as to be fitted to round cornered rectangular light receiving window 17 and second light guide body 44b has the rectangular section, so that remote controller signal light 15 emitted from remote controller 14 is incident inside light guide body 44, and the ratio of incidence in light receiving sensor 43 becomes greater, while a part of the section of the light guide body shows the round cornered rectangle so as to be fitted to the round cornered rectangular light receiving window 17. Consequently, it is possible to prevent the lowering of the light receiving sensitivity of remote controller 14.

Furthermore, while the section of second light guide body 44b is described as being formed in the rectangle in this exemplary embodiment, an experiment related to an allowable machining degree for making round corners by removal of four rectangular corners was performed.

Figure 8A:
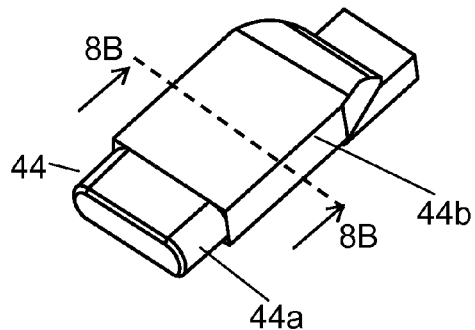
FIG. 8A is a perspective view of the light guide body according to the exemplary embodiment.
Figure 8B:
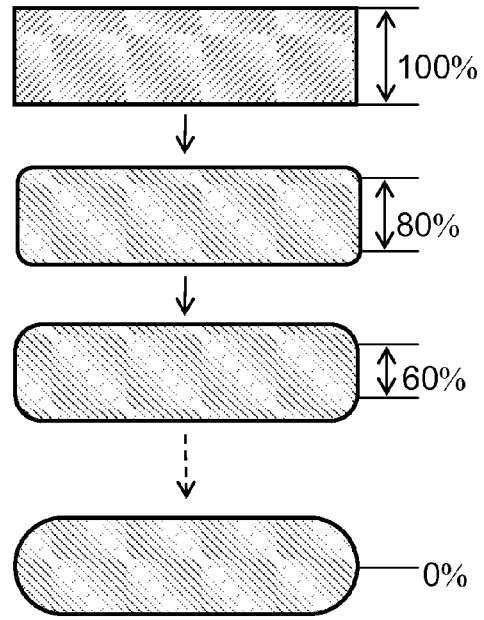
FIG. 8B is a diagram for illustrating ratios of a straight line to a height of a section taken along line 8B-8B of FIG. 8A.
Figure 8C:
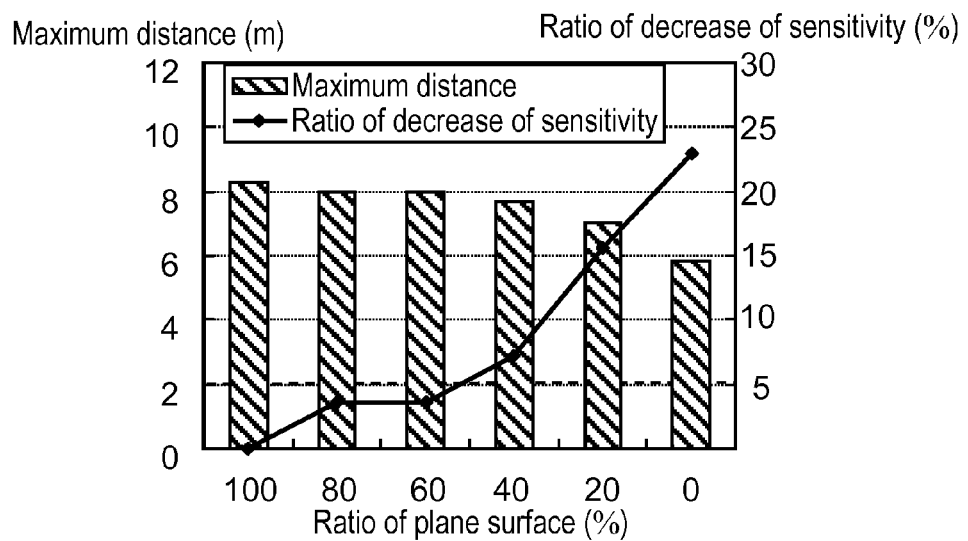
FIG. 8C is a characteristic diagram showing a result of change in the ratios of the straight line to the height of the section of second light guide body 44b.

FIG. 8A is a perspective view of light guide body 44 according to this exemplary embodiment, FIG. 8B is a diagram for illustrating ratios of a straight line to a height of a section taken along line 8B-8B of FIG. 8A, and FIG. 8C is a characteristic diagram showing a result of change in the ratios of the straight line to the height of the section of second light guide body 44b.

Light guide body 44 has a height of 2.0 mm, a width of 7.0 mm, and a depth of 9.0 mm, and second light guide body 44b and first light guide body 44a have a depth of 8.0 mm and a depth of 1.0 mm out of a depth of 9.0 mm, respectively.

As shown in FIG. 8B, four corners were made round such that the ratio of the straight line to the height of the section is 100%, 80%, 60%, . . . , 0%, and maximum operable distances between remote controller 14 and the thin liquid crystal television were measured.

In FIG. 8C, a horizontal axis represents the ratio of the straight line to the height of the section of second light guide body 44b, a left vertical axis represents the maximum operable distance between remote controller 14 and the thin liquid crystal television, and a right vertical axis represents a ratio of decrease of a maximum distance to a maximum distance where the ratio of the straight line to the height of the section of second light guide body 44b is 100%, which is a ratio of decrease of sensitivity. An incident angle of remote controller signal light 15 of remote controller 14 was set to ±30 degrees.

As shown in FIG. 8C, it has been found that: when the ratio of the straight line to the height of the section of second light guide body 44b is 60% or more, the maximum distance is 8 m or more and the ratio of decrease of sensitivity is 4% or less; when the ratio of the straight line to the height of the section of second light guide body 44b is 40%, the maximum distance is 7.8 m, and the ratio of decrease of sensitivity is 7%; when the ratio of the straight line to the height of the section of second light guide body 44b is 20%, the maximum distance is 7 m and the ratio of decrease of sensitivity is 16%; and when the ratio of the straight line to the height of the section of second light guide body 44b is 0%, the maximum distance is 6.5 m and the ratio of decrease of sensitivity is 23%.

From this result, in a case where a ratio of decrease of sensitivity of 5% is set as an allowable range, it is possible to prevent the lowering of light receiving sensitivity when the ratio of the straight line to the height of the section of second light guide body 44b is at least 50% or more.

Furthermore, an experiment related to an allowable degree of a ratio in a depth direction of first light guide body 44a and second light guide body 44b of this exemplary embodiment was also performed.

Figure 9A:
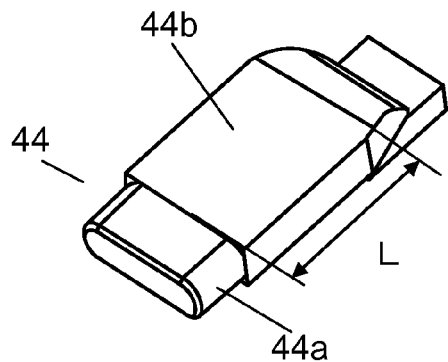
FIG. 9A is a perspective view of light guide body according to the exemplary embodiment.
Figure 9B:
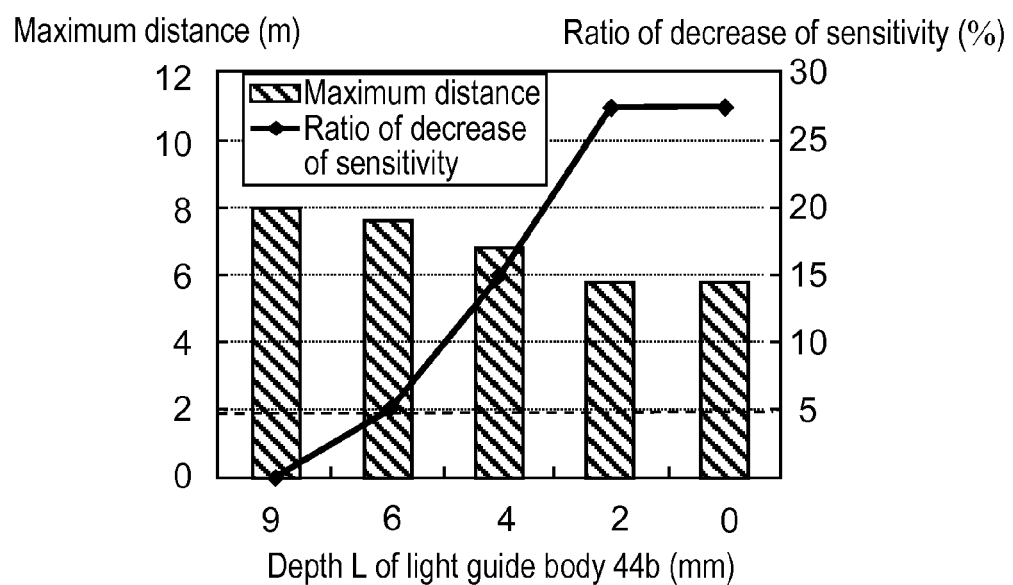
FIG. 9B is a characteristic diagram showing a result of change in a depth of the light guide body of FIG. 9A.

FIG. 9A is a perspective view of light guide body 44 according to the exemplary embodiment, and FIG. 9B is a characteristic diagram showing a result of change in a depth of second light guide body 44b of FIG. 9A.

Light guide body 44 has a height of 2.0 mm, a width of 7.0 mm, and a depth of 9.0 mm, and the depth of second light guide body 44b is changed to 0 mm, 2.0 mm, 4.0 mm, 6.0 mm, and 9.0 mm out of a depth of 9.0 mm, so that maximum operable distances between remote controller 14 and thin liquid crystal television 100 were measured.

In FIG. 9B, a horizontal axis represents depth L of second light guide body 44b, a left vertical axis represents the maximum operable distance between remote controller 14 and the thin liquid crystal television 100, and a right vertical axis represents a ratio of decrease of a maximum distance to a maximum distance where depth L of second light guide body 44b is 9.0 mm, which is a ratio of decrease of sensitivity. An incident angle of remote controller signal light 15 of remote controller 14 was set to ±30 degrees.

As shown in FIG. 9B, it has been found that as depth L of second light guide body 44b decreases from 9.0 mm, the maximum distance decreases, and the ratio of decrease of sensitivity almost linearly changes.

From this result, in a case where a ratio of decrease of sensitivity of 5% is set as an allowable range, it is possible to prevent the lowering of light receiving sensitivity when depth L of second light guide body 44b is 6 mm or more, namely, is at least ⅔ or more of an entire length of light guide body 44.

[1-3. Effects and the Like]

As described above, photoreceiver 16 of this exemplary embodiment includes light receiving sensor 43 that receives remote controller signal light 15 from remote controller 14 to convert the received remote controller signal light 15 into an electric signal, and light guide body 44 that guides remote controller signal light 15 to light receiving sensor 43. Light guide body 44 includes at least first light guide body 44a that includes incident surface 16a upon which remote controller signal light 15 is incident, and second light guide body 44b that includes emission surface 16b from which remote controller signal light 15 is emitted, and the section of first light guide body 44a shows a round cornered rectangle, and the section of second light guide body 44b shows a substantial rectangle.

Consequently, the ratio of incidence of remote controller signal light 15 emitted from remote controller 14 to be incident inside light guide body 44 and into light receiving sensor 43 becomes greater, while a part of the section of light guide body 44 shows the round cornered rectangle so as to be fitted to the round cornered rectangular light receiving window 17, thereby enabling prevention of the lowering of the light receiving sensitivity of remote controller 14.

Furthermore, in photoreceiver 16 of this exemplary embodiment, the section of second light guide body 44b shows the substantial rectangle, the ratio of the straight line to the height of the section of second light guide body 44b is 50% or more.

Consequently, it is possible to remarkably prevent the lowering of the light receiving sensitivity of remote controller 14.

Additionally, the depth of second light guide body 44b is at least ⅔ or more of the depth of light guide body 44.

Consequently, it is possible to remarkably prevent the lowering of the light receiving sensitivity of remote controller 14.

Moreover, the display device of this exemplary embodiment includes photoreceiver 16, liquid crystal display panel 11, and bezel 12 that is provided around liquid crystal display panel 11, and has, at a lower side, a round cornered rectangular light receiving window 17 which receives remote controller signal light 15 from remote controller 14. The section of first light guide body 44a of photoreceiver 16 shows a round cornered rectangle, and is configured to be fitted to light receiving window 17.

Consequently, it is possible to provide a display device that is capable of preventing the lowering of the light receiving sensitivity of remote controller 14.

It should be noted that, while a material of bezel 12 is metal such as aluminum in the description, the material may also be resin.

What is claimed is:

1. A photoreceiver comprising:
   a light receiving sensor that receives remote controller signal light from a remote controller to convert the received remote controller signal light into an electric signal; and
   a light guide body that guides the remote controller signal light to the light receiving sensor,
   wherein the light guide body includes at least a first light guide body that includes an incident surface upon which the remote controller signal light is incident, and a second light guide body that includes an emission surface from which the remote controller signal light is emitted, and a section of the first light guide body shows a round cornered rectangle, and a section of the second light guide body shows a substantial rectangle.

2. The photoreceiver according to claim 1,
   the section of the second light guide body shows the substantial rectangle, and a ratio of a height, of a straight portion of a side of the section of the second light guide body, to a height, of the section of the second light guide body, is 50% or more.

3. The photoreceiver according to claim 1,
   a depth of the second light guide body is at least ⅔ or more of a depth of the light guide body.

4. A display device comprising:
   the photoreceiver according to claim 1;
   a display panel; and
   a bezel that is provided around the display panel, and has, at a lower side, a round cornered rectangular light receiving window which receives remote controller signal light from a remote controller,
   wherein the first light guide body of the photoreceiver is fitted to the light receiving window.

* * * * *